United States Patent
Foslien et al.

(12) United States Patent Foslien et al.

(10) Patent No.: US 7,243,048 B2
(45) Date of Patent: Jul. 10, 2007

(54) FAULT DETECTION SYSTEM AND METHOD USING MULTIWAY PRINCIPAL COMPONENT ANALYSIS

(75) Inventors: Wendy K. Foslien, Minneapolis, MN (US); Satya Varaprasad Allumallu, Edina, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/288,818

(22) Filed: Nov. 28, 2005

(65) Prior Publication Data
US 2007/0124113 A1    May 31, 2007

(51) Int. Cl.
*G06F 17/18* (2006.01)

(52) U.S. Cl. .................. 702/185; 702/115; 702/182; 702/183; 701/99

(58) Field of Classification Search ............... 702/185, 702/115
See application file for complete search history.

(56) References Cited

U.S. PATENT DOCUMENTS

| | | | |
|---|---|---|---|
| 5,339,628 A | 8/1994 | Maus et al. ................... 60/277 |
| 5,687,082 A | 11/1997 | Rizzoni ...................... 701/111 |
| 5,748,500 A | 5/1998 | Quentin et al. ............ 702/182 |
| 5,821,412 A | 10/1998 | Bryant et al. .............. 73/117.3 |
| 5,930,993 A | 8/1999 | Kammann et al. ............. 60/274 |
| 6,408,259 B1 | 6/2002 | Goebel et al. .............. 702/183 |
| 6,497,227 B2 | 12/2002 | Wang et al. ........... 123/568.16 |
| 6,519,552 B1 | 2/2003 | Sampath et al. ........... 702/183 |
| 6,574,537 B2 | 6/2003 | Kipersztok et al. .......... 701/29 |
| 6,687,596 B2 | 2/2004 | Humerickhouse et al. .. 701/100 |
| 6,760,689 B2 | 7/2004 | Follin et al. ................ 702/188 |
| 6,985,779 B2 * | 1/2006 | Hsiung et al. ................ 700/19 |
| 7,031,778 B2 * | 4/2006 | Hsiung et al. ................ 700/29 |
| 2002/0183866 A1 | 12/2002 | Dean et al. ................... 700/26 |
| 2004/0172227 A1 | 9/2004 | Aragones ....................... 707/8 |
| 2004/0176901 A1 | 9/2004 | Uluyol et al. .............. 701/100 |
| 2005/0141782 A1* | 6/2005 | Guralnik et al. ........... 382/276 |
| 2005/0149297 A1 | 7/2005 | Guralnik et al. ........... 702/189 |

* cited by examiner

*Primary Examiner*—Hal Wachsman
(74) *Attorney, Agent, or Firm*—Ingrassia Fisher & Lorenz

(57) ABSTRACT

A fault detection system and method is provided that facilitates detection of faults that are manifest over a plurality of different operational phases. The fault detection system and method use multiway principal component analysis (MPCA) to detect fault from turbine engine sensor data. Specifically, the fault detection system uses a plurality of load vectors, each of the plurality of load vectors representing a principal component in the turbine engine sensor data from the multiple operational phases. The load vectors are preferably developed using sets of historical sensor data. When developed using historical data covering multiple operational phases, the load vectors can be used to detect likely faults in turbine engines. Specifically, new sensor data from the multiple operational phases is projected on to the load vectors, generating a plurality of statistical measures that can be classified to determine if a fault is manifest in the new sensor data.

22 Claims, 9 Drawing Sheets

FAULT DETECTION SYSTEM AND METHOD USING MULTIWAY PRINCIPAL COMPONENT ANALYSIS

FIELD OF THE INVENTION

This invention generally relates to diagnostic systems, and more specifically relates to fault detection in turbine engines.

BACKGROUND OF THE INVENTION

Modern aircraft are increasingly complex. The complexities of these aircraft have led to an increasing need for automated fault detection systems. These fault detection systems are designed to monitor the various systems of the aircraft to detect potential faults. These systems are designed to detect these potential faults such that the potential faults can be addressed before the potential faults lead to serious system failure and possible in-flight shutdowns, take-off aborts, and delays or cancellations.

Engines are, of course, a particularly critical part of the aircraft. As such, fault detection for aircraft engines are an important part of an aircrafts fault detection system. Some traditional engine fault detection has been limited to methods that use engine data taken over a relatively small period of time. While these methods have been effective in detecting some faults, they are less effective in detecting faults where symptoms arise over a relatively larger time period. In particular, those faults which show symptoms over multiple phases of operation. For these types of faults some traditional fault detection methods have been unable to unable to consistently detect all potential faults that can effect the operation of the engine.

BRIEF SUMMARY OF THE INVENTION

The present invention provides an improved fault detection system and method. The fault detection system provides the ability to detect faults that are manifest over a plurality of different operational phases. For example, the fault detection system provides the ability to detect faults that are manifest over transitions from takeoff to cruise to landing. The fault detection system and method use multiway principal component analysis (MPCA) to detect fault from turbine engine sensor data, where the turbine engine sensor covers multiple different operational phases in the turbine engine.

Specifically, the fault detection system uses a plurality of load vectors, each of the plurality of load vectors representing a principal component in the turbine engine sensor data from the multiple operational phases. The load vectors are preferably developed using sets of historical sensor data. Each load vector includes a plurality of elements, with each element capturing a corresponding direction of variation in the historical sensor data. When developed using historical data covering multiple operational phases, the load vectors can be used to detect likely faults in turbine engines. Specifically, new sensor data from the multiple operational phases is projected on to the load vectors, generating a plurality of statistical measures that can be classified to determine if a fault is manifest in the new sensor data.

A variety of different statistical measures can be created and classified for fault detection. For example, the statistical measures can include a plurality of scores and/or residual error estimates. In general, scores comprise a lower dimension representation of the new sensor data. The residual error estimates comprise a measurement of variation that doesn't match the load vector model. The scores and/or residual error estimates are then classified to determine if a fault manifest in the new sensor data. Detected faults can then be passed to a diagnostic system where they can be passed as appropriate to maintenance personnel.

In one embodiment, the scores are classified by comparing the scores to historical scores generated from historical sensor data, and the residual error estimates are compared to the actual sensor data to determine the likelihood of a fault in the turbine engine. The present invention thus provides a fault detection system and method that provides improved performance by providing the ability to detect faults that are manifest over a plurality of different operational phases.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

An improved fault detection system and method is provided. The fault detection system provides the ability to detect faults that are manifest over a plurality of different operational phases. For example, the fault detection system provides the ability to detect faults that are manifest over transitions from takeoff to cruise to landing. The fault detection system and method use multiway principal component analysis (PCA) to detect fault from turbine engine sensor data, where the turbine engine sensor covers multiple different operational phases in the turbine engine. Specifically, mulitway PCA provides a mechanism for modeling the many interdependent variables in a turbine engine as a function of time for repeated cycles, and is used to extract information from the relationships between these variables and use that information for fault detection.

Figure 1:
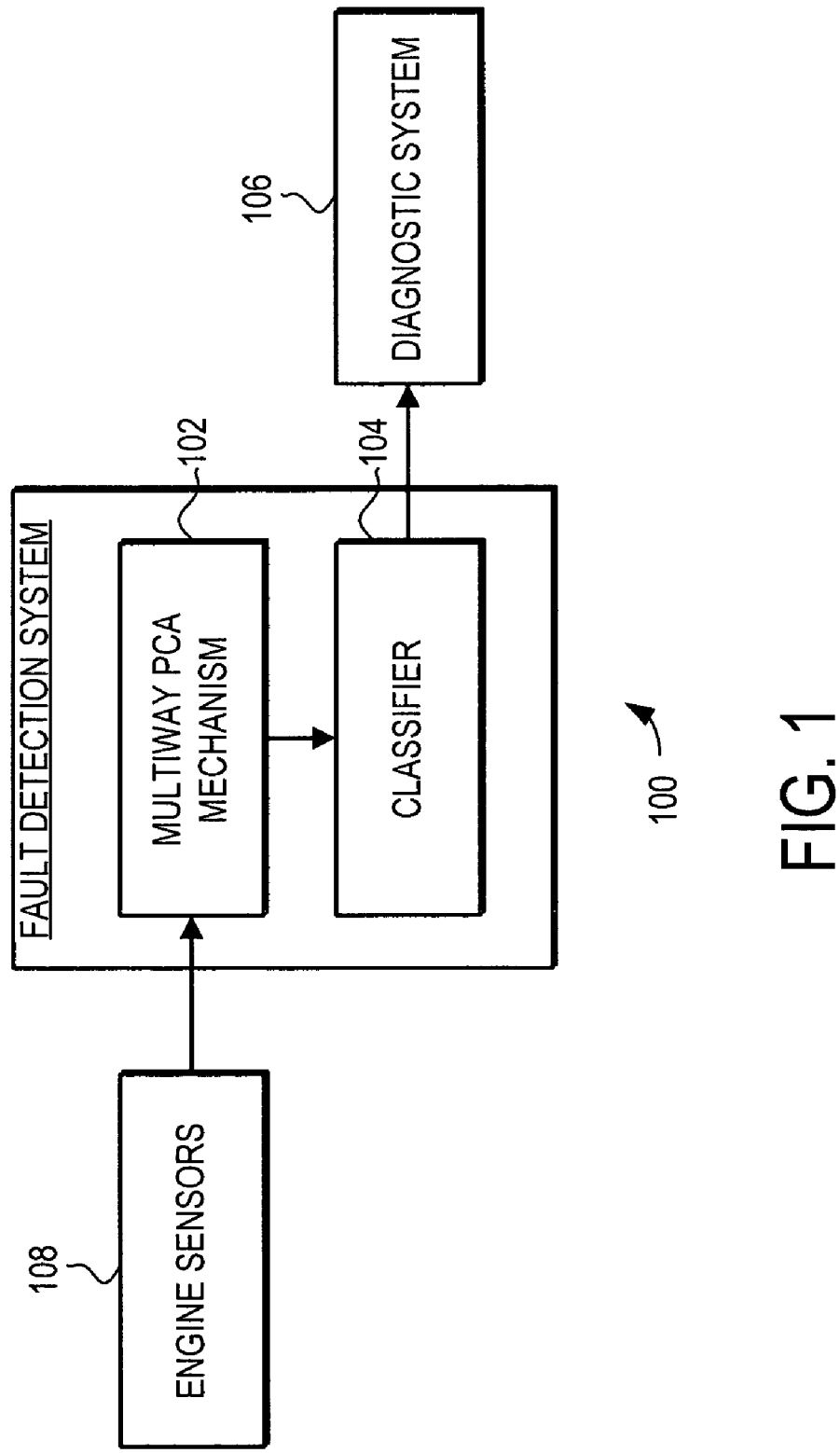
FIG. 1 is a schematic view of a multiway PCA fault detection system.

Turning now to FIG. 1, a fault detection system 100 is illustrated schematically. The fault detection system 100 includes a multiway principal component analysis (PCA) mechanism 102 and a classifier 104. The fault detection system 100 receives sensor data from engine sensors 108 in a turbine engine, and provides a likelihood of fault to a diagnostic system. The multiway PCA mechanism 102 includes a plurality of load vectors, each of the plurality of load vectors representing a principal component in the turbine engine sensor data from the multiple operational phases. The load vectors are preferably developed using sets of historical sensor data. Each load vector in the multiway PCA mechanism 102 includes a plurality of elements, with each element capturing a corresponding direction of variation in the historical sensor data. When developed using historical data covering multiple operational phases, the load vectors in the multiway PCA mechanism 102 can be used to detect likely faults in turbine engines as deviations from normal operational behavior.

Specifically, new sensor data from the engine sensors 108 is taken from the operational phases of the turbine engine. A variety of different types of sensor data can be used, including engine speed (e.g, compressor speed and/or main shaft speed), temperature (e.g., exhaust gas temperature) and pressure (e.g., combustor pressure). The type of sensor data used, and the rate at which it is collected would typically depend on the type of turbine engine being monitored and the particular types of faults that are being detected. This new sensor data is collected, formatted and then projected on to the load vectors, generating a plurality of statistical measures that can be evaluated by the classifier 104 to determine if a fault is manifest in the new sensor data.

A variety of different statistical measures can be created by multiway PCA mechanism 102 and used for fault detection. For example, the statistical measures can include a plurality of scores and/or residual error estimates. In general, scores comprise a lower dimension representation of the new sensor data. The magnitude of the scores represents variation in the new sensor data that is consistent with the training data. Thus, increasing scores indicate movement away from the training data set, which may indicate a precursor to or symptom of a fault. The residual error estimates are constructed by using the lower dimension representation to reconstruct sensor values, and comparing the actual sensor values to the reconstructed values. The residual error provides a measurement of variation that shows inconsistency with the underlying set of load vectors. Large residual error may also be a precursor or symptom of a fault. The scores and/or residual error estimates are then passed to the classifier 104, where they are classified to determine if faults are manifest in the new sensor data. Detected faults can then be passed to a diagnostic system 106 where they can be passed as appropriate to maintenance personnel.

In one embodiment, the classifier 104 classifies the scores by comparing the scores to historical scores generated from historical sensor data, and comparing the residual error estimates to the actual sensor data to determine the likelihood of a fault in the turbine engine. For example, the classifier 104 can use statistical confidence limits. In this application the historical sensor data is used to define confidence intervals for the scores and residual error estimates. The scores and residual data estimates from new sensor data are then compared against these confidence intervals. This provides a theoretically sound technique for classifying the scores and residual error estimates. Of course, this is just one example of how the classifier 104 can be implemented. Other classification techniques can be used, such as analysis of the patterns generated in the residual error.

A general description of PCA will now be given, followed by an explanation of how multiway PCA is a variation of PCA procedures. In general, PCA is a feature extraction method that linearly transforms an original set of variables into a substantially smaller set of uncorrelated variables. The substantially smaller set of uncorrelated variables represents the information in the original set of variables. The general goal of the dimension reduction is to achieve a more efficient combination of the original features.

As one detailed example of a PCA, it can be shown that the optimal linear solution for representing n-dimensional vectors X in an m-dimensional space, where m<n, is to project X onto the surface spanned by the m largest eigenvectors of the covariance matrix. The projection to the principal subspace captures key directions of variance in the data, which can be used to separate data clusters.

In a particular example, let X denote an n-dimensional vector having zero mean. The linear feature extraction can be written as:

$$Y = F^T X \qquad \text{Equation 1.}$$

In which Y is an m-dimensional feature vector and F is an n×m matrix built from m orthogonal n-dimensional vectors. If the original n-dimensional feature space is linearly reconstructed from the extracted m-dimensional feature vectors, the approximation of the vector X can be written as:

$$\hat{X} = FY = FF^T X \qquad \text{Equation 2.}$$

The information lost in this projection, which is the measure of the performance of the feature extraction, can be written as:

$$MSE = E(|X - \hat{X}|^2) \qquad \text{Equation 3.}$$

In which E is the expectation operator. Since the vectors in F are orthogonal, it can be rewritten as:

$$MSE = E(X^T X - X^T F F^T X) \qquad \text{Equation 4.}$$

Minimizing the reconstruction error means rotating the orthogonal vectors in F to the successive directions of the largest variance. Therefore, PCA finds a projection onto a subspace spanned by the m largest eigenvectors of the covariance matrix. Geometrically, the first principal component is the axis of maximum variance in the observations. Projecting the observations on this axis generates a new variable, and its variance is the maximum among all possible choices of this axis. The second principal component is another axis, perpendicular to the first axis. Projecting the observations on the second axis generates another new variable whose variance is the maximum among all possible choices of this second axis.

It should be noted that a principal component analysis results in one or more extracted principal components derived from a specific sensor data set. For example, a PCA analysis can extract five principal components from a first sensor data set, and five principal components from a second sensor data set. For fault detection, we seek a consistent set of vectors that describe the behavior of multiple sets of normal operational data.

Multiway PCA (MPCA) expands the concept of PCA to include relationships between observations over a finite time sequence. Thus, MPCA can be used to understand the variations between batches of data over similar sequences, and locate the source of that variation. For fault detection in a turbine engine, MPCA can thus be used to analyze data from a plurality of turbine engines over a plurality of different operational phases. Each flight will have a repeated sequence of operational phases, and MPCA applied to turbine engine data compares behavior across this repeated sequence of operational phases. To facilitate this, the input data to the MPCA mechanism is typically formatted into a three dimensional matrix with I batches of data, where each batch i includes data from j sensors for k samples. Thus, a set of batches is represented by a matrix of dimension i×j×k. As one specific implementation, each batch i of data includes sensor data from a plurality of turbine engines operating over a repeated sequence of a plurality of different operational phases.

Because eigenvector decomposition typically requires a two dimensional matrix, the three dimensional matrix of batch data is typically unfolded into a two dimensional representation. Several different methods can be used to unfold a three dimensional matrix of sensor data. However, to facilitate analysis of variation between batches it is generally desirable to use a method that facilitates calculation and removal of nominal batch trajectory, where the nominal batch trajectory is defined as the average trajectory for each sensor in the normal operational data. Thus, each batch of data can be unfolded in the manner i×(j*k), where the columns can either be organized by time sample or by variable. Thus, an entire data set for one batch can thus be handled as one observation for PCA analysis.

To implement a multiway PCA mechanism 102 for fault detection in a turbine engine historical data is formatted and unfolded into a two dimensional matrices and used develop load vectors. Flight phase information as well as time warping based on alignment variable is used to crate consistent unfolding. Each load vector in the multiway PCA mechanism 102 includes a plurality of elements, with each element capturing a corresponding direction of variation in the historical sensor data. Once the unfolding is done, the development of load vectors is straightforward. When unfolded, a standard two dimensional data matrix is generated. Then the covariance matrix can be calculated, and eigenvalues and eigenvectors extracted from the covariance matrix. The eigenvectors can then be used as the load vectors. When developed using historical data covering multiple operational phases, the load vectors in the multiway PCA mechanism 102 can be used to detect likely faults in turbine engines by taking new sensor data. The new sensor data is formatted into a three dimensional matrix, which is then unfolded into a two dimensional matrix representation. The same flight phase information and alignment data used on the training data is used in the unfolding process. The two-dimensional representation of the new sensor data is then projected on to the load vectors, generating a plurality of statistical measures that can be classified by the classifier 104 to determine if a fault is manifest in the new sensor data. For example, scores and residual error for the new sensor data can be compared against the confidence limits generated from the training data.

As stated above, each batch of data preferably includes sensor data from several different phases of operation in the turbine engine. This allows the fault detection system to find variations between different operational phases. In one example, these phases include ground acceleration, ascent to cruising altitude, and leveling off at cruising altitude. Of course this is just one example. As another example, the phases can include cruising altitude, descent and landing. Thus, sensor data is collected over all of these different phases and formatted for input to the multiway PCA mechanism 102. This allows the multiway PCA mechanism to monitor changes as the turbine engines go from one phase to another, and to take into account to the correlation relationships between engines and within each engine over the whole multi-phase trajectory at once. Specifically, the load vectors of the multiway PCA mechanism 102 represent the relationships between elements of sensor data as a function of time or their position in the sensor data. Stated another way, each element of the load vector indicates how much variance is captured by the corresponding point in the data. Thus, the correlation relationships between data points in the sensor data are represented. The multiway PCA mechanism 102 thus allows batches of sensor data to be examined to determine if they have a consistent correlation the historical sensor data used to create the load vectors.

Specifically, when new sensor data is projected on the load vectors of the multiway PCA mechanism 102 the mechanism creates statistical measures that can be classified for fault detection. For example, the statistical measures can include a plurality of scores and/or residual error estimates. The scores and/or residual error estimates are then passed to the classifier 104, where they are classified to determine if faults are manifest in the new sensor data.

In one embodiment, a score is generated by the multiway PCA mechanism 102 for each batch of data and is then be compared to a distribution of historical scores. This facilitates determination of how the new scores compare to the historical data scores. Thus, the scores indicate how consistent the new sensor data is with the old historical data, in terms of distances from the historical data scores that is indicative of inconsistent correlation behavior.

In one embodiment a score is generated for each batch of data, and the scores are then used to generate Hotelling's $T^2$ statistics. Hotelling's $T^2$ statistic is a multivariate counterpart of Student's-t test, and are calculated for principal component models as a scaled summation of the first m scores. Thus, $T^2$ is the distance of the observation within the plane defined by the principal components. Each batch of data will have a single $T^2$ value. The $T^2$ statistic for a new observation measures the multivariate distance of the current observation from the hyperplane defined by the training data set. In this embodiment, the $T^2$ statistic for a new flight is compared to the limits defined by the flights in the training set.

In another embodiment the multiway PCA mechanism 102 generates a plurality of residual error estimates. In general, the residual error estimates provide a mechanism for evaluating variations that are not explained by the load vectors, or stated another way, for variations that do not match the model represented by the load vectors. In one specific implementation the residual error estimates are used to generate a measure known as the Q statistic. The Q statistic comprises a summation of prediction error. For example, the Q statistic can be generated as a sum of the squares of the distances of a single observation from the space defined by the multiway PCA model. For multiway PCA, this single observation is an entire batch. Specifically, for turbine engine monitoring the single observation is a multivariate trajectory over multiple flight phases. Each observation will thus have a single Q statistic, with the Q statistic being a measure of the distance of each observation from the hyperplane defined by the principal components. Again, using training data statistical confidence limits of the Q statistic can be developed and used for subsequent batches of data to compare to the distribution of historical Q statistics.

In further variations, both $T^2$ and Q statistics are classified by the classifier 104 to determine the likelihood of fault in the turbine engines. An abnormal condition will be indicated by unusually high Q or $T^2$ statistics, where "unusually" can be defined as values outside statistical confidence limits. It is also possible to further investigate the Q and $T^2$ excursions, to understand which element of the observation vector is contributing to the excursion. Individual contributions to both the Q and T statistics can be calculated. For example, contributions to the Q statistic are the individual residual error for each sensor at each time point in the batch flight data. This provides a mechanism to identify the source of the excursion.

As stated above, a variety of different techniques can be used for classification to determine the likelihood of fault in the turbine engines. In one example, a cluster analysis of the patterns generated in the residual error is used. In this embodiment load vectors are used to generate residual errors, and the residual errors from multiple events are combined to crate clusters. A spatial clustering analysis can then be used to determine which patterns resemble one another. Temporal sequences of clusters are then associated with different types of fault events, such as a signature pattern associated with bleed band failures. For example, the cluster or clusters are then found that are nearest to known clusters, and a sequence of cluster labels is generated. The sequence of cluster matches is then used to determine what type of fault is closest.

In another embodiment, the clusters can be formed from the combination of temporal or other ordered sequences of statistical outputs. In this example clustering is performed across an ordered set of the statistical outputs, where the sequences can include multiple flights, altitudes, locations, or other ordered groups. For example, contributions to the Q residual and Hotelling's $T^2$ may be used over a plurality of sequential flights as inputs to the clustering algorithm.

In some cases, a match to a cluster may not be found. If no cluster match is found, a check can be made to determine if two clusters might provide a good match, such as the two closest clusters. A goodness of fit algorithm can then be applied to determine which might be the closest pair of clusters. If a pair is found, the cluster can be split. If the closest two clusters are not a good match, then a new cluster can be created using a fitness metric that considers all the potential faults. For more information on one example of how a cluster analysis of the patterns generated in the residual error can be used, see U.S. Patent Application Publication 2005/0149297 to Guralnik and Foslien.

So implemented, the multiway PCA mechanism can be used to detect a variety of different types of faults in a turbine engine. Furthermore, when the mechanism detects excursions from normal behavior, the details of the excursion can then be used to identify the fault.

A detailed example focusing on detecting bleed band failures in a turbine engine will now be discussed. In this example, four types of sensor data are used for fault detection. The sensor data includes EGT (Exhaust Gas Temperature), N1 (Fan Speed), N2 (Compressor Speed) and FF (Fuel Flow). The sensor data is collected for three different phases of operation, specifically from just before takeoff, take-off to climb and just after cruise. Thus, three different zones of transient behavior are used along with a steady state segment at the end of the cruise data. In this example there are 4 engines on each aircraft, and hence 16 sensor data observations are used at each time point, and the data is measured at a sampling rate of 4 Hz. To facilitate multiway PCA analysis, the batch length is made uniform and altitude is used as indicator variable for batch synchronization as it is a monotonically increasing parameter between take-off and cruise.

Figure 2:
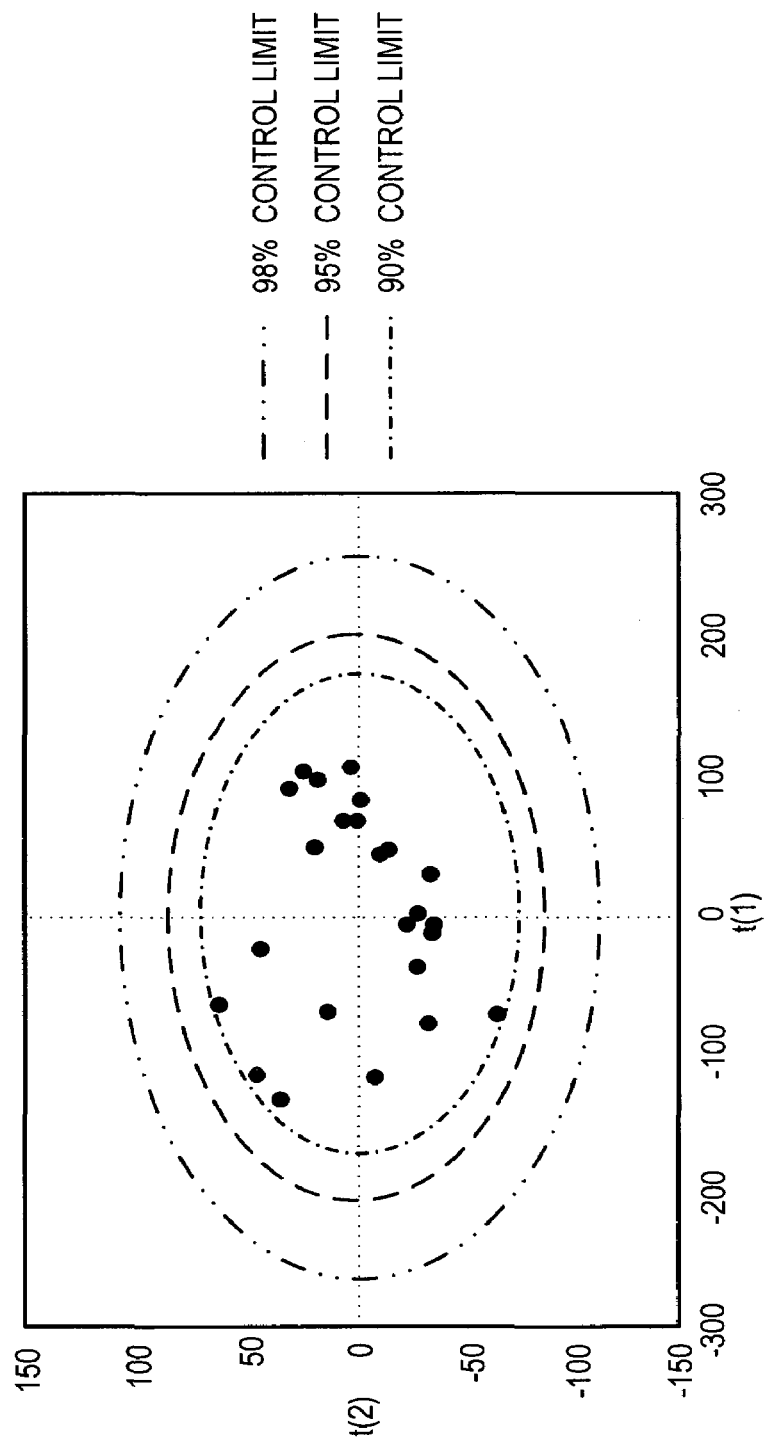
FIGS. 2-7 are exemplary graphs of statistical measures used for fault detection in one exemplary embodiment.
Figure 3:
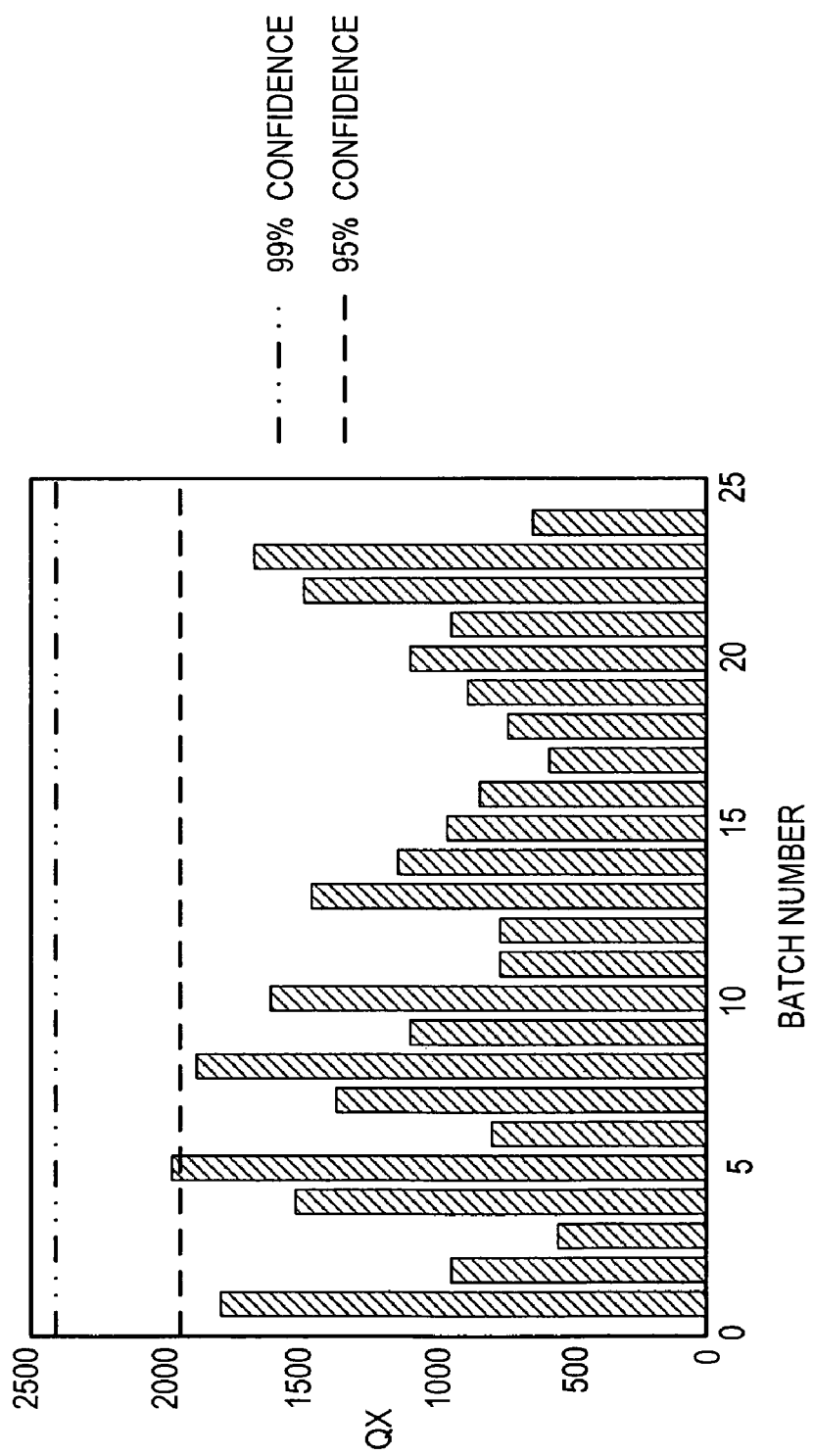
Figure 4:
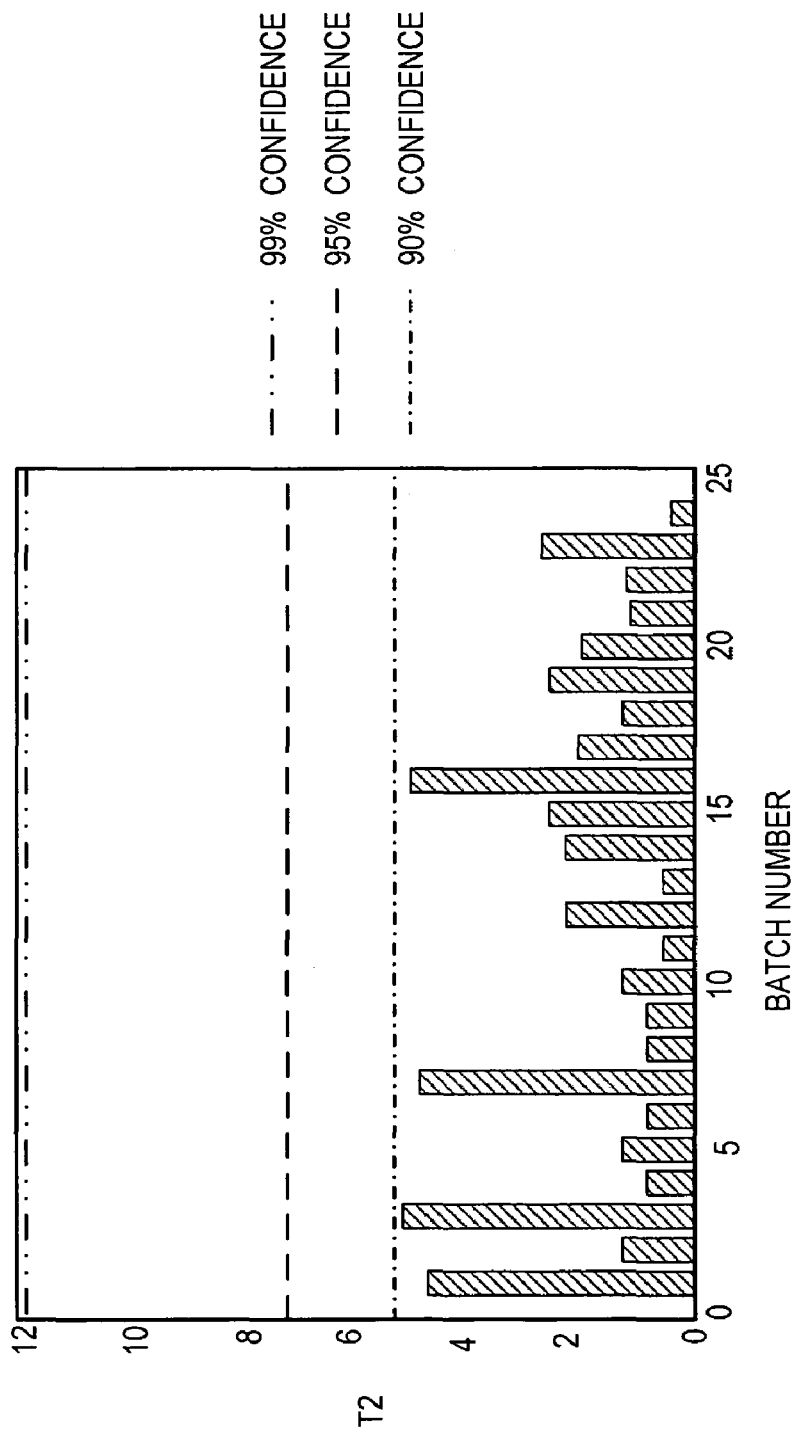

Turning now to FIGS. 2-4, exemplary data representing normal operating conditions is illustrated. Specifically, in FIG. 2, a graph 200 illustrates scores generated from normal turbine engines. Likewise, in FIG. 3 a graph 300 illustrates Q statistics, and in FIG. 4 a graph 400 illustrates Hotelling's $T^2$ statistics from normal turbine engines. In each graph several control limits are illustrated. As can be seen FIGS. 2-4, each of the flights are within the control limits.

Figure 5:
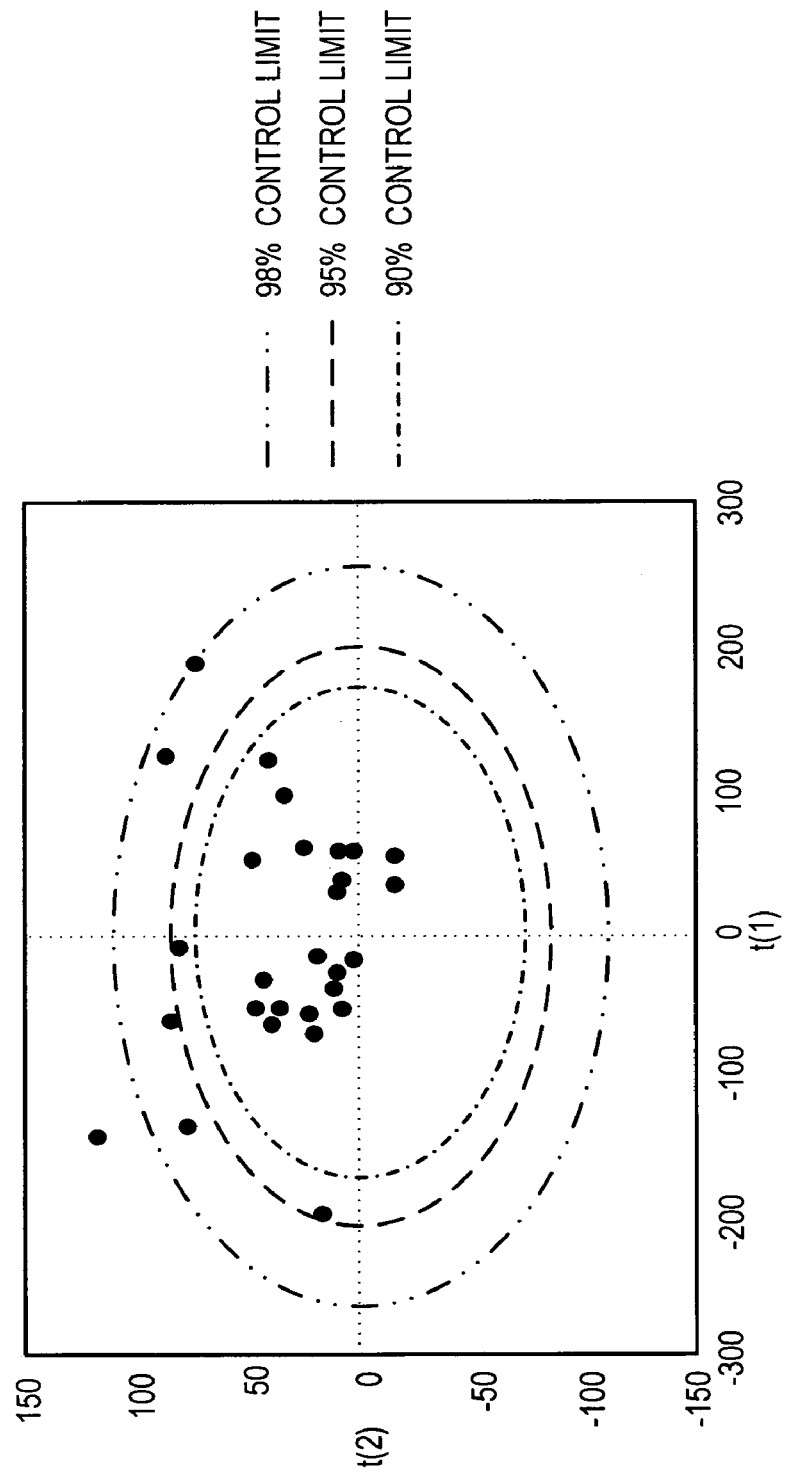
Figure 6:
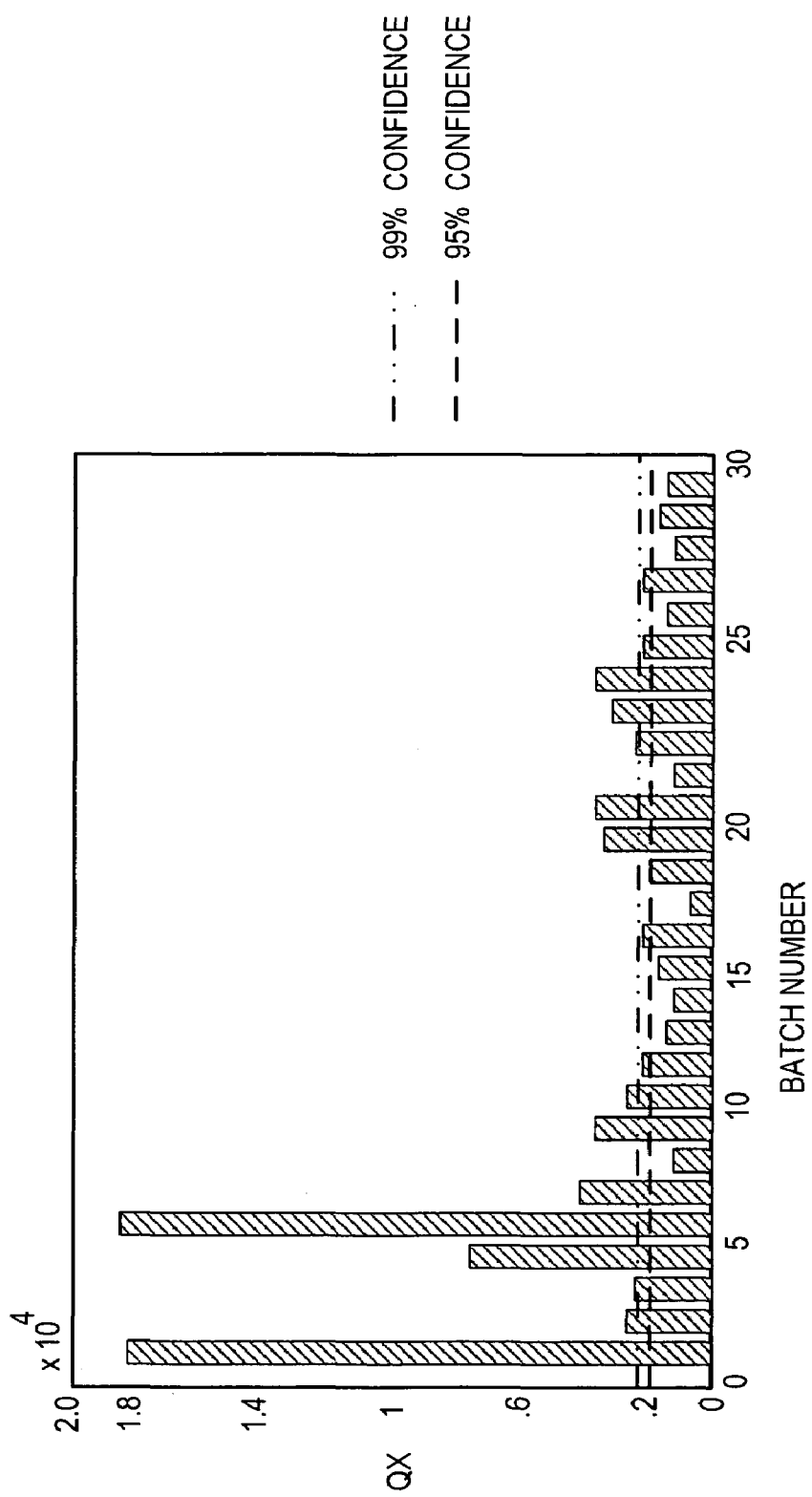
Figure 7:
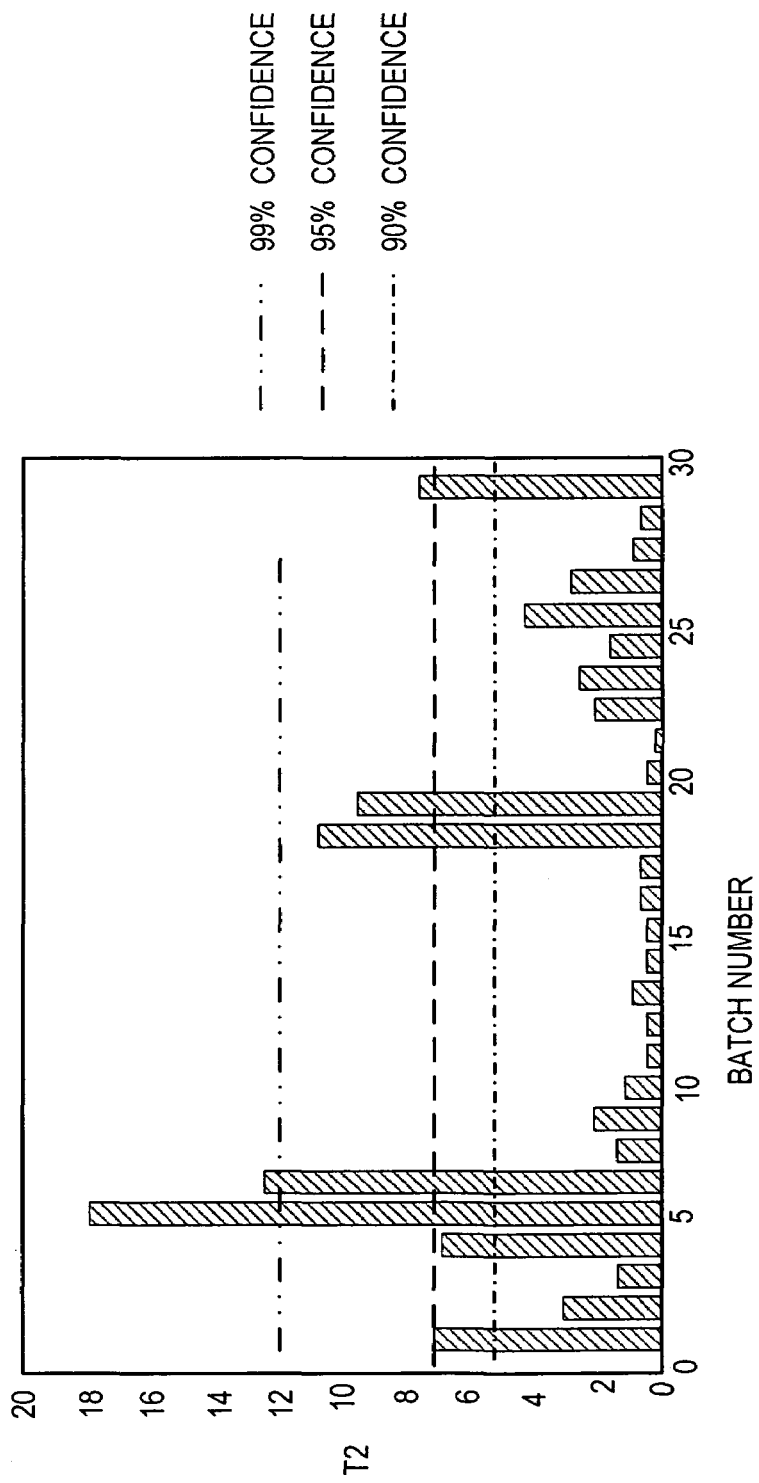

Turning now to FIGS. 5-7, exemplary data representing a faulty turbine engine is illustrated. Specifically, in FIG. 5, a graph 500 illustrates scores generated from a faulty engine. Likewise, in FIG. 6 a graph 600 illustrates Q statistics, and in FIG. 7 a graph 700 illustrates Hotelling's $T^2$ statistics from a faulty turbine engine. As can be seen FIGS. 5-7, several flights are outside of the control limits and are operating away from the defined normal operating conditions.

Figure 8:
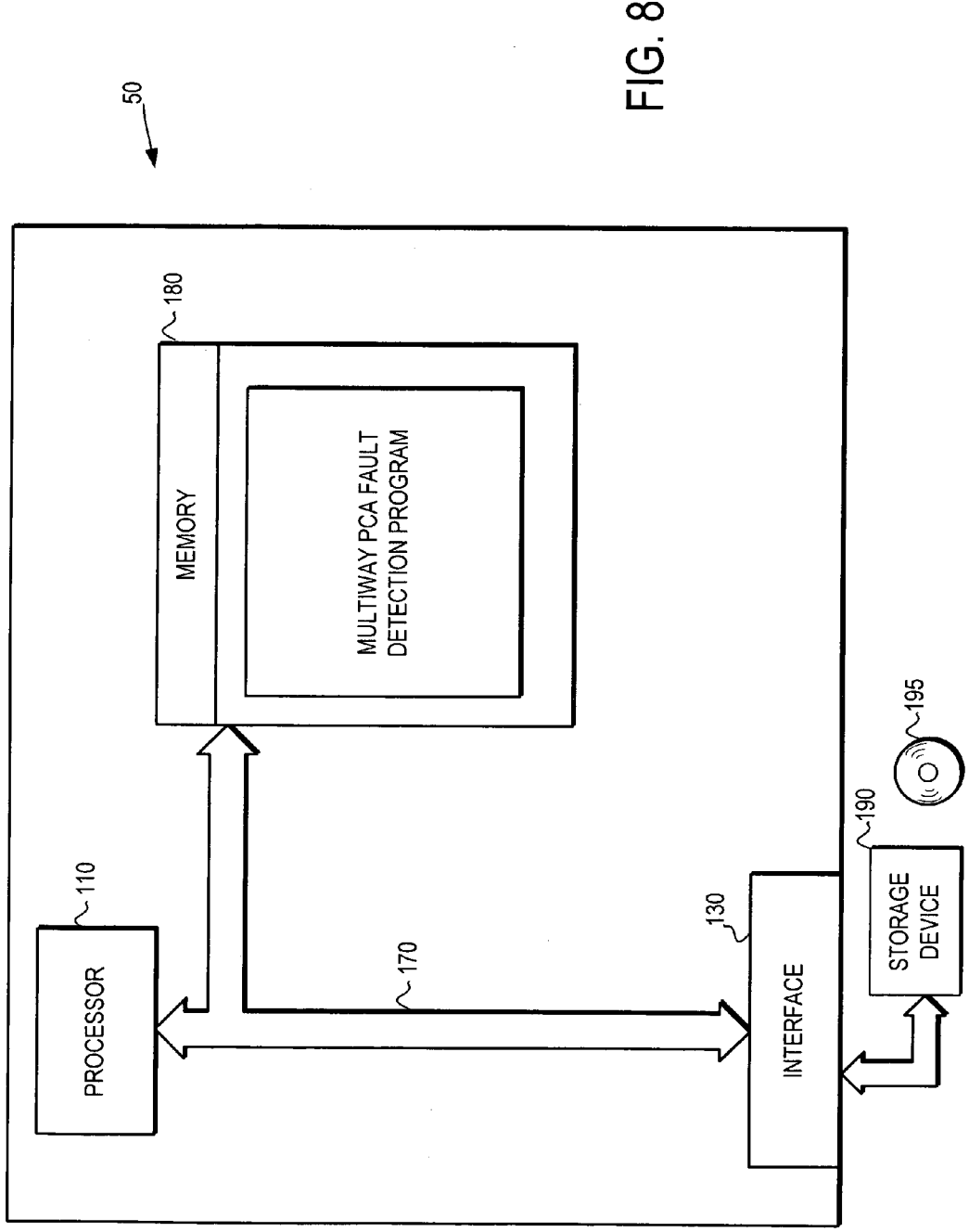
FIG. 8 is a schematic view of a computer system that includes a multiway PCA fault detection program in accordance with one embodiment of the invention.

The multiway PCA fault detection system and method can be implemented in wide variety of platforms. Turning now to FIG. 8, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a multiway PCA fault detection program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 8, storage device 190 can comprise a disc drive device that uses discs 195 to store data.

In accordance with the preferred embodiments of the invention, the computer system 50 includes the multiway PCA fault detection program. Specifically during operation, the multiway PCA fault detection program is stored in memory 180 and executed by processor 110. When being executed by the processor 110, the multiway PCA fault detection system monitors vehicle operation parameters to identify potential faults in the turbine engine.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as flash memory, floppy disks, hard drives, memory cards and optical disks (e.g., disk 195), and transmission media such as digital and analog communication links, including wireless communication links.

Figure 9:
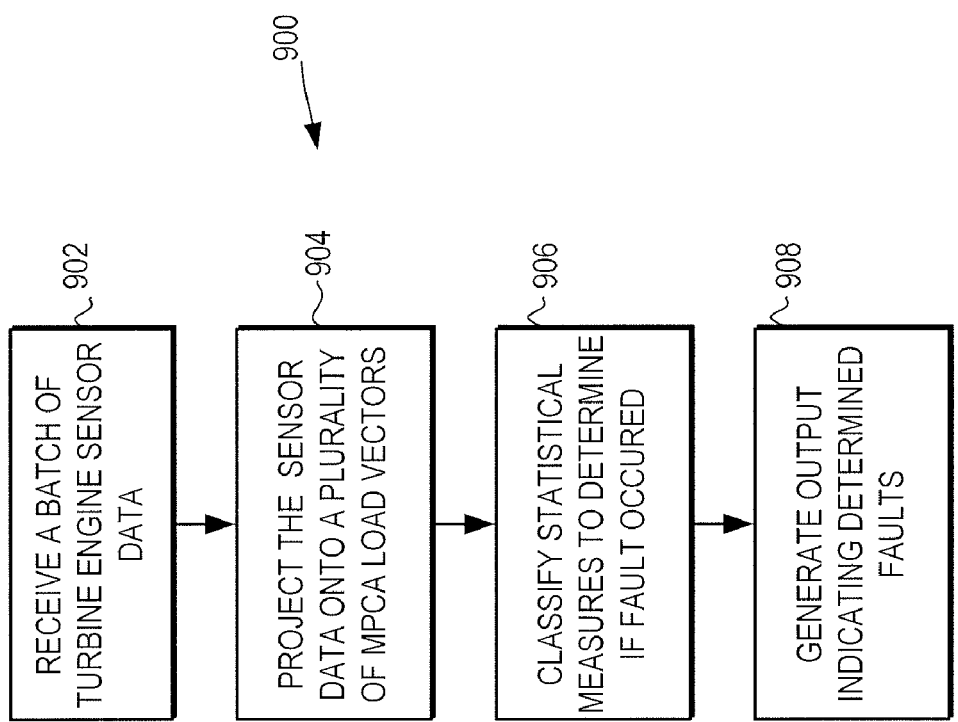
FIG. 9 is a flow diagram of a multiway PCA fault detection method in accordance with one embodiment of the invention.

Turning now to FIG. 9, a flow diagram of a multiway PCA fault detection method is illustrated. The first step 902 is to receive a batch of turbine engine sensor data from a plurality of turbine engines, where the batch of turbine engine sensor data includes sensor data from the plurality of turbine engines operating over a plurality of different operational phases. Because each batch includes sensor data from several different operational phases, the changes from one phase to another are represented in the data. Additionally, because the batch of sensor data includes data from a plurality of engines the correlation of relationships between engines is represented in the data. The next step 904 is to project the batch of turbine engine sensor data onto a plurality of multiway principal component analysis (MPCA) load vectors. This generates a plurality of statistical measures. A variety of different types of statistical measures can be created using these techniques, including Hotelling's $T^2$ statistics and residual error estimates. The next step 906 is to classify the plurality of statistical measures to determine if a fault occurred in the plurality of turbine engines during the plurality of different operational phases. In one embodiment, the step of classifying is performed using a clustering analysis. The next step 908 is to generate an output indicative of the determined fault. For example, the output can be generated and passed to an onboard diagnostics system, or to a ground based system providing remote diagnostics.

The present invention thus provides an improved fault detection system and method. The fault detection system provides the ability to detect faults that are manifest over a plurality of different operational phases. For example, the fault detection system provides the ability to detect faults that are manifest over transitions from takeoff to cruise to landing. The fault detection system and method use multiway principal component analysis (PCA) to detect fault from turbine engine sensor data, where the turbine engine sensor covers multiple different operational phases in the turbine engine. Specifically, mulitway PCA provides a mechanism for modeling the many interdependent variables in a turbine engine, and is used to extract information from the relationships between these variables and use that information for fault detection.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A fault detection system for detecting faults in a plurality of turbine engines, the fault detection system comprising:
    a multiway principal component analysis (MPCA) mechanism, the MPCA mechanism adapted to receive a batch of turbine sensor data from the plurality of turbine engines, the batch of turbine sensor data including sensor data from the plurality of turbine engines operating over a plurality of different operational phases, the MPCA mechanism including a plurality of load vectors, each of the plurality of load vectors representing a principal component in the turbine sensor data, the MPCA mechanism further adapted to project the batch of turbine sensor data onto the plurality of load vectors to generate a plurality of statistical measures; and
    a classifier, the classifier adapted to receive the plurality of statistical measures and analyze the plurality of statistical measures to determine if a fault occurred in the plurality of turbine engines during the plurality of different operational phases, the classifier further generating an output indicating the fault responsive to the classifier determining that the fault occurred in the plurality of turbine engines during the plurality of different operational phases.

2. The system of claim 1 wherein the plurality of statistical measures comprise a plurality of scores.

3. The system of claim 1 wherein the plurality of statistical measures comprise a plurality of residual error estimates.

4. The system of claim 1 wherein the classifier is adapted to analyze the plurality of statistical measures by determining a distance between the plurality of statistical measures and statistical measures obtained from historical sensor data.

5. The system of claim 1 wherein the classifier is adapted to analyze the plurality of statistical measures by determining if the plurality of statistical measures lie within statistical confidence intervals obtained from historical sensor data.

6. The system of claim 1 wherein the classifier is adapted to analyze the plurality of statistical measures by determining clusters in which the plurality of statistical measures reside.

7. The system of claim 6 wherein the classifier is adapted to determine a temporal sequence of the clusters.

8. The system of claim 1 wherein the classifier is adapted to analyze the plurality of statistical measures by generating Q statistics from the plurality of statistical measures and determining if the Q statistics lie within statistical confidence intervals obtained from historical sensor data.

9. The system of claim 1 wherein the classifier is adapted to analyze the plurality of statistical measures by generating $T^2$ statistics from the plurality of statistical measures and determining if the $T^2$ statistics lie within statistical confidence intervals obtained from historical sensor data.

10. The system of claim 1 wherein the plurality of different operational phases includes ground acceleration, ascent to cruising altitude, and leveling off at cruising altitude.

11. The system of claim 1 wherein the batch of turbine sensor data is formatted into a three-dimensional matrix and wherein the MPCA mechanism is adapted to unfold the three-dimensional matrix into a two dimensional representation to facilitate projecting of the batch of turbine sensor data onto the plurality of load vectors.

12. A method of detecting faults in a turbine engine, the method comprising the steps of:
  receiving a batch of turbine engine sensor data from a plurality of turbine engines, the batch of turbine engine sensor data including sensor data from the plurality of turbine engines operating over a plurality of different operational phases;
  projecting the batch of turbine engine sensor data onto a plurality of multiway principal component analysis (MPCA) load vectors to generate a plurality of statistical measures;
  classifying the plurality of statistical measures to determine if a fault occurred in the plurality of turbine engines during the plurality of different operational phases; and
  generating an output indicating the fault responsive to determining the fault occurred in the plurality of turbine engines during the plurality of different operational phases.

13. The method of claim 12 wherein the plurality of statistical measures comprise a plurality of scores.

14. The method of claim 12 wherein the plurality of statistical measures comprise a plurality of residual error estimates.

15. The method of claim 12 wherein the step of classifying comprises determining a distance between the plurality of statistical measures and statistical measures obtained from historical sensor data.

16. The method of claim 12 wherein the step of classifying comprises determining if the plurality of statistical measures lie within statistical confidence intervals obtained from historical sensor data.

17. The method of claim 12 wherein the step of classifying comprises determining if the plurality of statistical measures create a cluster.

18. The method of claim 12 wherein the step of classifying comprises generating Q statistics from the plurality of statistical measures and determining if the Q statistics lie within statistical confidence intervals obtained from historical sensor data.

19. The method of claim 12 wherein the step of classifying comprises generating $T^2$ statistics from the plurality of statistical measures and determining if the $T^2$ statistics lie within statistical confidence intervals obtained from historical sensor data.

20. The method of claim 12 wherein the plurality of different operational phases includes ground acceleration, ascent to cruising altitude, and leveling off at cruising altitude.

21. The method of claim 12 further comprising the step of formatting the batch of turbine engine sensor data into a three-dimensional matrix and unfolding the three-dimensional matrix into a two dimensional representation prior to the step of projecting the batch of turbine engine sensor data onto a plurality of multiway principal component analysis (MPCA) load vectors to generate a plurality of statistical measures.

22. A program product comprising:
  a) a fault detection program for detecting faults in a plurality of turbine engines, the fault detection program including:
    a multiway principal component analysis (MPCA) mechanism, the MPCA mechanism adapted to receive a batch of turbine sensor data from the plurality of turbine engines, the batch of turbine sensor data including sensor data from the plurality of turbine engines operating over a plurality of different operational phases, the MPCA mechanism including a plurality of load vectors, each of the plurality of load vectors representing a principal component in the turbine sensor data, the MPCA mechanism adapted to project the batch of turbine sensor data onto the plurality of load vectors to generate a plurality of statistical measures; and
    a classifier, the classifier adapted to receive the plurality of statistical measures and analyze the plurality of statistical measures to determine if a fault occurred in the plurality of turbine engines during the plurality of different operational phases, the classifier further generating an output indicating the fault responsive to the classifier determining that the fault occurred in the plurality of turbine engines during the plurality of different operational phases; and
  b) computer-readable signal-bearing recordable media bearing said fault detection program.

* * * * *